United States Patent
Goodwin et al.

(10) Patent No.: US 7,971,197 B2
(45) Date of Patent: *Jun. 28, 2011

(54) AUTOMATIC INSTRUCTION SET ARCHITECTURE GENERATION

(75) Inventors: David William Goodwin, Sunnyvale, CA (US); Dror Maydan, Palo Alto, CA (US); Ding-Kai Chen, San Jose, CA (US); Darin Stamenov Petkov, Hayward, CA (US); Steven Weng-Kiang Tjiang, Palo Alto, CA (US); Peng Tu, San Ramon, CA (US); Christopher Rowen, Santa Cruz, CA (US)

(73) Assignee: Tensilica, Inc., Santa Clara, CA (US)

( * ) Notice: Subject to any disclaimer, the term of this patent is extended or adjusted under 35 U.S.C. 154(b) by 1714 days.

This patent is subject to a terminal disclaimer.

(21) Appl. No.: 11/208,239

(22) Filed: Aug. 18, 2005

(65) Prior Publication Data

US 2005/0278713 A1 Dec. 15, 2005

Related U.S. Application Data

(63) Continuation of application No. 09/981,291, filed on Oct. 16, 2001, now Pat. No. 6,941,548.

(51) Int. Cl.
*G06F 9/45* (2006.01)
*G06F 15/00* (2006.01)
*G06F 15/76* (2006.01)

(52) U.S. Cl. .................. 717/151; 712/3; 712/7; 712/24; 712/41; 712/227

(58) Field of Classification Search .................. None
See application file for complete search history.

(56) References Cited

U.S. PATENT DOCUMENTS

| | | | | |
|---|---|---|---|---|
| 4,710,867 A | * | 12/1987 | Watanabe | 712/8 |
| 5,361,373 A | | 11/1994 | Gilson | |
| 5,530,881 A | * | 6/1996 | Inagami et al. | 712/7 |
| 5,696,956 A | | 12/1997 | Razdan et al. | |
| 5,819,064 A | | 10/1998 | Razdan et al. | |
| 5,835,771 A | * | 11/1998 | Veldhuizen | 717/154 |
| 5,933,642 A | | 8/1999 | Greenbaum et al. | |

(Continued)

FOREIGN PATENT DOCUMENTS

WO    WO 00/46704    8/2000

(Continued)

OTHER PUBLICATIONS

Bruce K. Holmer and Alvin M. Despain, Viewing instruction set design as an optimization problem, [online], retrieved on Feb. 4, 2011. Retrieved from the Internet: <URL:http://portal.acm.org/citation.cfm?id=123497&%3Bamp%3Bcoll=portal&%3Bamp%3BdI=ACM&%3Bamp%3BCFID=20560523&%3Bamp%3BCFTOKEN=92140572>.*

(Continued)

*Primary Examiner* — Tuan Q Dam
*Assistant Examiner* — Hanh T Bui
(74) *Attorney, Agent, or Firm* — Mark J. Danielson; Pillsbury Winthrop Shaw Pittman LLP (57) ABSTRACT

A digital computer system automatically creates an Instruction Set Architecture (ISA) that potentially exploits VLIW instructions, vector operations, fused operations, and specialized operations with the goal of increasing the performance of a set of applications while keeping hardware cost below a designer specified limit, or with the goal of minimizing hardware cost given a required level of performance.

22 Claims, 10 Drawing Sheets

U.S. PATENT DOCUMENTS

| | | | |
|---|---|---|---|
| 6,016,395 A * | 1/2000 | Mohamed | 717/149 |
| 6,035,123 A | 3/2000 | Razdan et al. | |
| 6,058,469 A | 5/2000 | Baxter | |
| 6,182,206 B1 | 1/2001 | Baxter | |
| 6,233,599 B1 | 5/2001 | Nation et al. | |
| 6,457,173 B1 * | 9/2002 | Gupta et al. | 717/149 |
| 6,615,340 B1 | 9/2003 | Wilmot, II | |
| 6,779,107 B1 | 8/2004 | Yates | |
| 7,047,394 B1 * | 5/2006 | Van Dyke et al. | 712/209 |
| 7,275,246 B1 * | 9/2007 | Yates et al. | 718/100 |
| 7,278,137 B1 * | 10/2007 | Fuhler et al. | 717/153 |
| 7,543,119 B2 * | 6/2009 | Hessel et al. | 711/154 |
| 2003/0005423 A1 * | 1/2003 | Chen et al. | 717/154 |
| 2004/0117599 A1 * | 6/2004 | Mittal et al. | 712/210 |
| 2006/0150170 A1 * | 7/2006 | Larin et al. | 717/158 |
| 2008/0282064 A1 * | 11/2008 | Day et al. | 712/35 |

FOREIGN PATENT DOCUMENTS

| | | |
|---|---|---|
| WO | WO 01/61576 | 8/2001 |

OTHER PUBLICATIONS

Haiyong Xie et al., Architectural analysis and instruction-set optimization for design of network protocol processors [online], retrieved on Feb. 4, 2011, pp. 153-162. Retrived from the Internet: <URL: http://portal.acm.org/citation.cfm?id=944703>.*

Ronald A. Thisted, Computer Architecture [online], retrieved on Feb. 4, 2011, pp. 1-5. Retrieved from the Internet: <URL: http://galton.uchicago.edu/~thisted/Distribute/comparch.pdf>.*

Ohtsuki, et al., "HW/SW Cooperative Design System PEAS-II for VLIW Processors", *Information Processing Society Symposium Series, Information Processing Society of Japan*, Jul. 16, 1998, vol. 98, No. 9, pp. 53-58.

Aditya et al., "Automatic Architectural Synthesis of VLIW and EPIC Processors", System Synthesis 1999 Proceeding, 12th Int'l Symp., San Jose, CA, Nov. 10-12, 1999.

Compton et al., "Configurable Computing: A Survey of Systems and Software", Technical Report, Northwestern University, Dept. of ECE 1999.

Fisher et al., "Custom-fit Processors: Letting Applications Define Architectures", Proceedings of the Annual IEEE/ACM Int'l Symp. on Microarchitecture, pp. 324-335, Dec. 2, 1996.

Hauck et al., "The Chimaera Reconfigurable Functional Unit", Proceedings of the IEEE Symposium on Field-Programmable Custom Computing Machines, 1997.

Huang et al., "Synthesis of Application Specific Instruction Sets", IEEE Transactions on Computer Aided Design of Integrated Circuits and Systems, IEEE Inc., NY, 14(6):663-675.

Jain et al., "ASIP Design Methodologies: Survey and Issues", 14th International Conference on VLSI Design, pp. 76-81, Jan. 3-7, 2001.

Razdan et al., "A High-Performance Microarchitecture with Hardware-Programmable Function Units", Proceedings of MICRO-27, Nov. 1997.

Wang et al., "Hardware/Software Instruction Set Configurability for System-on-Chip Processors", Proceedings of Design Automation Conference, 2001.

* cited by examiner

```
config vec4      {  VL           =  4,
                    IW           =  2,
                    OC           =  {  MEMORY, MULT, ALU, USER   },
                    ITS          =  {  { MEMORY,   MULT },
                                 =     { MEMORY,   ALU  },
                                 =     { MEMORY,   USER },
                                 =     { ALU,      MULT },
                                 =     { ALU,      ALU  },
                                 =     { ALU,      USER },
                    OW [MEMORY]  =  1, (FULL),
                    OW [ALU]     =  1, (FULL),
                    OW [MULT]    =  0.5 (Half),
                    OW [USER]    =  0.5 (Half),
                    COS          =  { }
                 }
```

```
config SCALAR    {  VL          = 1,
                    IW          = 1,
                    OC          = {  MEMORY, MULT, ALU, USER  },
                    ITS         = {  {  MEMORY   },
                                =    {  MULT     },
                                =    {  ALU, },
                                =    {  USER     }  },
                    OW [MEMORY] = 1 (FULL),
                    OW [ALU]    = 1 (FULL),
                    OW [MULT]   = 1 (FULL),
                    OW [MEMORY] = 1 (FULL),
                    COS         = { }
                 }
```

FIG. 3

```
int      c[100];
int124   a[100], b[100];
for (i = 0; i < 100, i++)
  c[i] = 12 + MUL24 (a[i], b[i]);
```

FIG. 4A

EXEC_CNT: 100
VL: { 1, 2, 4 }

```
load      a[i],    load_const  12;
load      b[i],    MUL24_0;
                   MUL24_1;
store     c[i],    add;
```

```
load      a[i],            load_const   12;
load      b[i],            MUL24_0;
fused (store c[i] / add),  MUL24_1;
```

AUTOMATIC INSTRUCTION SET ARCHITECTURE GENERATION

CROSS REFERENCE TO RELATED APPLICATIONS

This application is a continuation of U.S. patent application Ser. No. 09/981,291 filed Oct. 16, 2001 now U.S. Pat. No. 6,941,548 the contents of which are incorporated herein by reference.

BACKGROUND OF THE INVENTION

The present invention is directed toward digital computing systems. More particularly, it is directed to the automatic specification of programmer-visible features in digital computing systems.

An Instruction Set Architecture (ISA) describes the instructions, operations, and register files of a processor that are made visible to the programmer (Hennessy et al., *Computer Architecture, A Quantitative Approach*, 2 ed., Ch. 2) The ISA for a general purpose processor is designed to provide a reasonable level of performance for a wide variety of applications. In contrast, the ISA for an embedded or application-specific processor is designed for a specific set of applications with the goal of improving the performance of those applications as much as possible, or to meet a minimum performance requirement. For example, the performance of an application that decodes a video stream must satisfy the minimum requirement that the video is decoded in real time. Thus, the ISA designed for a processor that executes the video stream decoding application must provide the minimum level of performance required by the application, without regard to the level of performance the ISA provides for other applications.

At the same time, it is desirable to minimize the cost of the processor hardware required to implement the ISA. Thus, the ISA designer must balance required application performance against the processor hardware cost to implement the ISA.

When designing an ISA, the designer can exploit several techniques, each of which has different tradeoffs between potential performance improvement and hardware cost. These techniques include Very Long Instruction Word (VLIW) (Hennessy et al., *Computer Architecture, A Quantitative Approach*, $2^{nd}$ ed., Section 4.4, pp. 284-285), Vector Operations (Hennessy et al., *Computer Architecture, A Quantitative Approach*, $2^{nd}$ ed., Appendix B), Fused Operations and Specialization.

VLIW

The VLIW technique allows a single instruction to contain multiple independent operations. A VLIW instruction is partitioned into a number of slots, and each slot may contain one operation. Describing a VLIW instruction simply requires specifying which operations can occur in each slot. For example, a two-slot VLIW instruction could allow a load operation in the first slot, and a multiply operation in the second slot.

If the ISA is designed to use VLIW, a source language compiler (for example, a C or C++ compiler) can use software-pipelining and instruction scheduling techniques to pack multiple operations into a single VLIW instruction, which has the potential to significantly increase performance (Lam, "Software Pipelining: An Effective Scheduling Technique for VLIW Machines", *Proceedings of the SIGPLAN 1988 Conference on Programming Language Design and Implementation*; Krishnamurthy, "A Brief Survey of Papers on Scheduling for Pipelined Processors", *SIGPLAN Notices*, V25, #7, July 1990). However, designing an ISA to use VLIW increases hardware cost compared with an ISA that does not use VLIW. Because a VLIW instruction issues and executes multiple independent operations in parallel, the hardware must contain multiple parallel decoders. Also, if multiple operations in the same VLIW instruction access the same register file, that register file must contain enough ports to satisfy all the possible accesses. In addition, if the VLIW instruction allows multiple instances of an operation to appear in the instruction, the hardware required to implement that operation must be duplicated so that the multiple instances of the operation can execute in parallel.

Thus, the number of slots in each VLIW instruction, the number of register file ports required to satisfy the operations in each VLIW instruction, and the combinations of operations allowed in each VLIW instruction influence both the performance improvement provided by the instructions, and the hardware cost of the logic required to implement the instructions. For example, a two-slot VLIW instruction that allows an integer add operation to occur in both slots requires that the integer register file have at least four read ports (each add requires two integer registers as input), and at least two write ports (each add produces a result into one integer register), and requires two copies of the addition logic. The additional decode logic, register file ports, and addition logic significantly increase hardware cost compared with a non-VLIW instruction, however, the hardware cost may be justified if being able to execute two add instructions in parallel significantly increases application performance.

To simplify the design of an ISA containing VLIW instructions, the prior art PICO system (Aditya et al., "Automatic Architectural Synthesis of VLIW and EPIC Processors", *Proc. International Symposium on System Synthesis*, ISSS '99, San Jose, Calif., November 1999, pp. 107-113) automatically creates a VLIW ISA from an application by searching the space of VLIW processors and evaluating the cost and performance of each. Within the design space searched by PICO, a VLIW processor is characterized by the size and types of register files, the operations, and the allowed combinations of operations in an instruction. Using the results of the search, the designer can choose a VLIW ISA that meets the performance and hardware cost requirements.

Vector Operations

The Vector Operations technique increases data throughput by creating vector operations that operate on more than one data element at a time (vector operations are also referred to as SIMD operations). A vector operation is characterized by the operation it performs on each data element, and by the number of data elements that it operates on in parallel, i.e., the vector length.

For example, a four-wide vector integer add operation adds two input vectors, each containing four integers, and produces a single result vector containing four integers. If the ISA is designed to use vector operations, a source language compiler may be able to use automatic parallelization and vectorization techniques (Wolfe, *Optimizing Supercompilers for Supercomputers*, MIT Press, Cambridge, Mass., 1989; Zima, Hans et al., *Supercompilers for Parallel and Vector Machines*, ACM Press/Addison-Wesley, Reading, Mass. 1991) to significantly increase performance of one or more of the application's loops. However, as with VLIW, using vector operations increases hardware cost because the vector operations require logic that can perform operations on multiple data elements in parallel. Also, the vector operations require vector register files capable of holding the vectors of data elements.

For example, a four-wide vector integer add requires logic to perform four integer adds in parallel, and requires a vector register file capable of holding vectors of four integer values. Thus, designing an ISA to use vector operations requires that the designer determine a set of vector operations, the number of data elements operated on by the vector operations, and the number of registers in the vector register file(s) accessed by the vector operations, such that desired application performance is balanced against hardware cost. To simplify the design of an ISA that uses vector operations, there is need in the art for an automatic ISA generation system that can create vector operations that improve application performance while balancing hardware cost.

Fused Operations

Fused Operations is a technique that creates operations composed of several simple operations. The Fused Operations technique is similar in spirit to Fused Multiply-Add (Hennessy et al., *Computer Architecture, A Quantitative Approach*, $2^{nd}$ ed., Section A.7), but unlike Fused Multiply-Add, the semantics of a fused operation is identical to the composition of the semantics of the simple operations.

Using the fused operation in place of the simple operations reduces code size and issue bandwidth, and may reduce register file port requirements. Also, the latency of the fused operation may be less than the combined latency of the simple operations. An example of a fused operation is the add-with-shift-by-1 operation present in Tensilica's Xtensa Architecture (*Xtensa Instruction Set Architecture Reference Manual*, Chapter 5, page 170). The add-with-shift-by-1 shifts a value left by one bit and then adds it to another value, and thus is a fused operation composed from a left shift operation and an add operation. One fused add-with-shift-by-1 operation replaces two simpler operations, and still executes in a single cycle.

Using fused operations may increase the hardware cost if the fused operation requires additional logic or if the fused operation requires additional register file ports to access its operands. Determining the set of fused operations that together provide performance improvement across a set of applications, and balancing that performance improvement against the hardware cost to implement the fused operations is a difficult task. Thus, to simplify the design of an ISA that uses fused operations, there is need in the art for an automatic ISA generation system that can create fused operations that improve application performance while balancing hardware cost.

Specialization

Specialization is a technique that creates an operation that always uses a smaller range of values for one or more of its operands than in the original operation. For example, a 16-bit multiply operation might be specialized into a multiply by a constant or it might be specialized into an 8-bit multiply if an application does not need the full generality of the original operation. Because the operation operates on a more limited input set, the logic required to implement the specialized operation is likely to be much simpler than the logic required for the original operation.

For example, a specialized multiply operation that always performs a multiply by three requires significantly less logic than a generic multiply operation. However, the application(s) may require the generic version of the operation in addition to the specialized version, and thus adding a specialized operation will increase hardware cost. A specialized operation can increase performance because the constant operand(s) does not need to be loaded into a register before executing the operation.

For example, to perform a multiply by three with a generic multiply operation requires that the constant "3" be loaded into a register that is then input to the multiply (assuming the multiply reads two registers for input), while the specialized multiply-by-three operation does not require the register load.

Determining the set of specialized operations that together provide performance improvement across a set of applications, and balancing that performance improvement against the hardware cost to implement the specialized operations is a difficult task. Thus, to simplify the design of an ISA that uses specialized operations, there is need in the art for an automatic ISA generation system that can create specialized operations that improve application performance while balancing hardware cost.

To get the maximum performance improvement for a given hardware cost, or to minimize hardware cost for a given performance improvement, the designer must consider an ISA that can contain any combination of vector operations, fused operations, specialized operations, and operations that combine those techniques (e.g., a single operation that can perform four parallel multiply-by-three-accumulate computations on two vectors of four integers, producing a result vector of four integers). In addition, the designer must consider the use of VLIW to allow multiple independent operations to be issued and executed in parallel. Simultaneously considering all four techniques when designing an ISA such that application performance is balanced against hardware cost is extremely difficult. Thus, there is need in the art for an automatic ISA generation system that uses VLIW, vector operations, fused operations, and specialized operations to create an ISA that improves application performance while balancing hardware cost.

SUMMARY OF THE INVENTION

In view of the above problems of the prior art, a preferred embodiment of the present invention automatically creates an Instruction Set Architecture (ISA) that potentially exploits VLIW instructions, vector operations, fused operations, and specialized operations with the goal of increasing the performance of a set of applications while keeping hardware cost below a designer specified limit, or with the goal of minimizing hardware cost given a required level of performance.

BRIEF DESCRIPTION OF THE DRAWINGS

These and other aspects of an embodiment of the present invention are better understood by reading the following detailed description of the preferred embodiment, taken in conjunction with the accompanying drawings, in which.

DETAILED DESCRIPTION OF THE INVENTION

A preferred embodiment of the present invention automatically creates an Instruction Set Architecture (ISA) that potentially exploits VLIW instructions, vector operations, fused operations, and specialized operations with the goal of increasing the performance of a set of applications while keeping hardware cost below a designer specified limit, or with the goal of minimizing hardware cost given a required level of performance.

The invention derives the operations implemented by the ISA from a set of original operations. In the preferred embodiment, the original operations include the operations necessary to support the application language on an original ISA such as a configuration of the Xtensa ISA, and may also include operations explicitly defined by the user. In the preferred embodiment, the user defines new operations using the Tensilica Instruction Extension (TIE) Language as described in U.S. Pat. No. 6,282,633 to Killian et al., as well as application Ser. Nos. 09/246,047 and 09/506,502, all incorporated herein by reference. For further information on TIE, please see Chapter 4 of the Tensilica Application Specific Microprocessor Solutions Overview Handbook, available at http://www.tensilica.com/technology_pdf.html. The present invention creates new operations by applying the Vector Operation, Fused Operation, and Specialization techniques to the original operations, as described below. The invention then uses VLIW to create new instructions composed of one or more original or new operations.

Operation Classes

The invention groups the original and new operations into operation classes. Ideally, an operation class represents operations that are implemented with shared hardware, and that require identical register file resources. For example, a 32-bit integer add operation and a 32-bit integer subtract operation both read two input registers and write a single output register. Also, most of the logic needed to implement the add and subtract operation is shared; thus the add and subtract operation should be placed in the same operation class. However, the invention does not require that operation classes are formed in this manner. In the preferred embodiment the following operation classes are used:

MEMORY: This operation class contains all original operations that access memory, including user-defined loads and stores. The MEMORY operation class also contains all new operations created from original memory operations using the Vector Operation, Fused Operation, and/or Specialization techniques.

USER, USER', USER", . . . : These operation classes contain all original user-defined operations, except for user-defined loads and stores, and all new operations created from user-defined operations using the Vector Operation, Fused Operation, and/or Specialization techniques. Fused operations composed of both a MEMORY class operation and an USER class operation are not included in the USER class. All user-defined operations are partitioned into different USER classes based on their operand usage so that all user-defined operations that have identical operand usage are placed in the same USER operation class.

MULT: This operation class contains all original operations that perform a multiply, excluding user-defined operations. The operation class also contains all new operations created from original multiply operations using the Vector Operation, Fused Operation, and Specialization techniques. Fused operations composed of both a MEMORY class operation and/or a USER class operation, and a MULT class operation are not included in the MULT class.

ALU: This operation class contains all original and new operations not contained in the MEMORY, MULT, or USER operation classes. Examples of such original operations are add, subtract, shift, etc.

Each operation produces and consumes values represented by one or more types. Original operations produce and consume original types. An original type represents a built-in type in the application's programming language, or a user-defined type specified in the preferred embodiment with the prior art TIE ctype construct. In the preferred embodiment, applications are expressed in the C and C++ programming languages, and so the built-in types are signed and unsigned variations of char, short, int, and long, as well as float and double. The original operations in an operation class may be manually limited by the user to operate on only some types. For example, if the application does not require operations on float or double values, then those operations can be removed from the operation classes, reducing the hardware required to implement the operation class.

New operations created by the invention produce and consume both original types and new types. A new type is created by the invention to represent a vector version of an original type. For example, a new type is created to represent a vector of four ints. From an original add operation that consumes the original int type, the invention can create a new four-wide vector add operation that consumes the new type representing a vector of four ints.

Each original type is contained in a register file. Multiple types may share the same register file. In the preferred embodiment, one register file is used to hold all original built-in integer types (signed and unsigned char, short, int, and long), and one register file is used to hold all original built-in real types (float and double). In the preferred embodiment, for each original user-defined type, the user specifies the register file that contains the type using the prior art TIE regfile construct.

Each new type is contained in a new register file created by the invention, as explained below. In the preferred embodiment, one new register file is created to hold all new types representing vector versions of built-in integer types, if any are created, and one new register file is created to hold all new types representing vector versions of built-in real types, if any are created. The invention also creates one new register file for each user-defined register file, to hold the vector version(s) of the user-defined types contained in the user-defined register files.

For the following examples, it is assumed that the MULT and ALU classes contain original operations that operate on the integer types (i.e., signed and unsigned char, short, int, and long), but not original operations that operate on real types (i.e., float and double). There is a single USER class that contains one user-defined operation, MUL24, that multiplies two values of the user-defined int24 type representing a 24-bit integer, and produces an int result. The MEMORY class contains original operations to load and store the integer types and the int24 type.

ISA Configuration

The characteristics of an ISA are described by one or more ISA configurations. The operations, instructions, and register files contained in the ISA are a union of the operations, instructions, and register files required by each ISA configuration that make up the ISA. In the preferred embodiment, an ISA configuration is composed of the following parameters:

1. Vector length (VL). Possible values are integers greater than zero. This parameter indicates the vector width of the operations represented by the configuration, and thus gives the number of scalar elements contained in each vector element. VL=1 indicates the operations operate on a single scalar, i.e., the configuration does not use vector operations.

2. Issue width (IW). Possible values are integers greater than zero. This parameter indicates the number of operations that can be contained in each VLIW instruction. IW=1 indicates that each instruction contains a single operation, i.e., the configuration does not use VLIW.

3. Operation classes (OC). A set of one or more operation classes that are implemented by the configuration. If a configuration implements an operation class, the configuration supports all the operations in the operation class, and includes the hardware necessary to execute those operations.

4. Instruction-template set (ITS). A set of one or more instruction templates that together describe all the allowed ways operation classes can be combined into a VLIW instruction. Each instruction template describes one allowed combination by specifying an operation class for each instruction slot. For example, the instruction template that indicates that a two slot VLIW instruction can have a memory operation in slot zero, and a multiply operation in slot one is {MEMORY, MULT}. An instruction-template set indicates all the allowed templates, thus ITS={{MEMORY, MULT}, {ALU, ALU}} indicates each instruction can contain a memory operation and a multiply operation (in slots zero and one respectively), or can contain two ALU operations (one in each slot).

5. Operation width (OW). Possible values are 1/n, where 'n' is a factor of VL. For each operation class this parameter indicates the fraction of elements in a vector operated on by the operation. For example, in a configuration with vector length 4, a full (OW=1) width multiply performs 4 multiplies in parallel, one for each element of the vector. A half (OW=0.5) width multiply performs 2 multiplies in parallel, operating on only 2 of the 4 elements in the vector (thus two multiply operations must be performed to multiply all 4 elements).

6. Combined Operations Set (COS). A set of one or more new operations formed using the Fused Operation technique and/or the Specialization technique, as described below.

Figure 1:
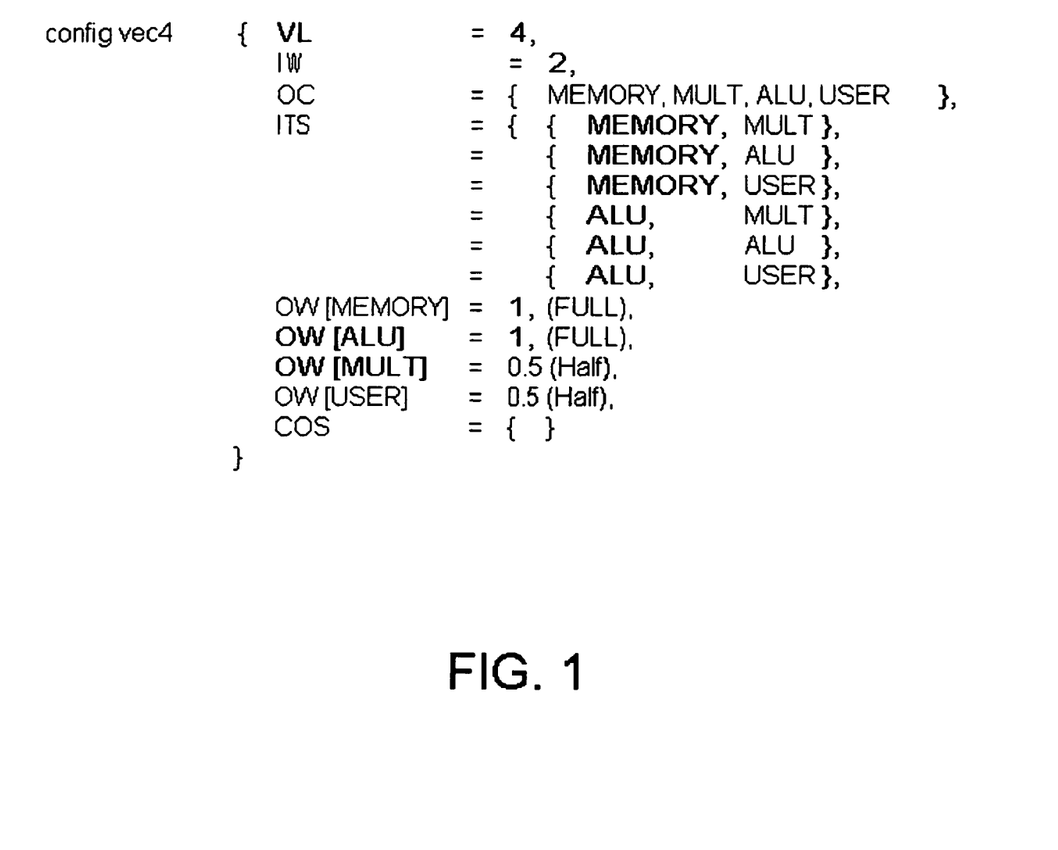
FIG. 1 is a vec4 configuration according to an embodiment of the present invention.

For example, the vec4 configuration shown in FIG. 1 describes a set of operations that operate on up to four scalar elements in parallel, with MEMORY class and ALU class operations performed on all four elements in parallel, and MULT class and USER class operations performed on two elements in parallel. The configuration includes the operations from all the operation classes, and allows 2 operations to be encoded in each instruction, with the allowed operation slot assignments shown by the instruction templates. The configuration implements no combined operations.

The hardware required to implement an ISA configuration is simply the register files and logic required to implement the features described by the configuration's parameters. In the preferred embodiment, the hardware cost of a configuration includes the cost of the operation issue and decode logic, the operation execution logic, the register file entries, the register file ports.

The configuration's IW and ITS determine how many parallel instances of the operation decode and issue logic are required. The instruction templates in ITS indicate the operations that each decoder must be capable of decoding. The decoder for an issue slot must decode all operations in each operation class that appears in that slot for any template. For the vec4 example, the decoder in slot 0 must decode MEMORY and ALU class operations, and the decoder in slot 1 must decode the MULT, ALU, and USER class operations.

The configuration's VL, OC, ITS, and OW determine the logic needed to implement the operations required by the configuration. OC indicates which operation classes, and thus which operations, must be implemented in the logic for the configuration. VL and OW indicate the number of data elements that each operation operates on, and thus indicate the number of computations the execution logic must perform in parallel. ITS indicates the operation classes that can be issued and executed in parallel, and thus indicates the number of parallel instances of the execution logic required for each operation.

For example, the vec4 configuration implements all the operation classes, and so the hardware required by the configuration includes the logic necessary to implement all the operations contained in all the operation classes. Because VL=4, and OW[MEMORY]=OW[ALU]=1, each operation in the MEMORY and ALU operation classes operates on four data elements in parallel, and thus the logic that implements each operation must perform four computations in parallel. Because VL=4 and OW[MULT]=OW[USER]=0.5, each operation in the MULT and USER operation classes operates on two data elements in parallel, and thus the logic that implements each operation must perform two computations in parallel. The vec4 configuration's {ALU, ALU} template indicates that two ALU class operations can executed simultaneously, thus the logic required to implement the configuration must contain two copies of the logic required for the ALU class operations.

The configuration's IW and ITS determine the number of register file ports required on each register file. The number of register file ports required for each register file is the maximum of the number of ports required by the operations that can occur in any instruction template. For the vec4 example, the {ALU, ALU} template indicates that two ALU class operations can execute simultaneously. Assuming the most integer register file accesses required by any operation in the ALU operation class is two integer register file reads and one integer register file write, the {ALU, ALU} template requires four integer register file read ports and two integer register file write ports. The maximum register file requirement over all instruction templates is the requirement of the configuration.

The number of entries in each register file required by the configuration is determined as the ISA is created, as explained below. Once the number of register file entries are known, the hardware cost of those register file entries is added to the initial hardware cost of the configuration.

Creating and Using a New ISA

Figure 2:
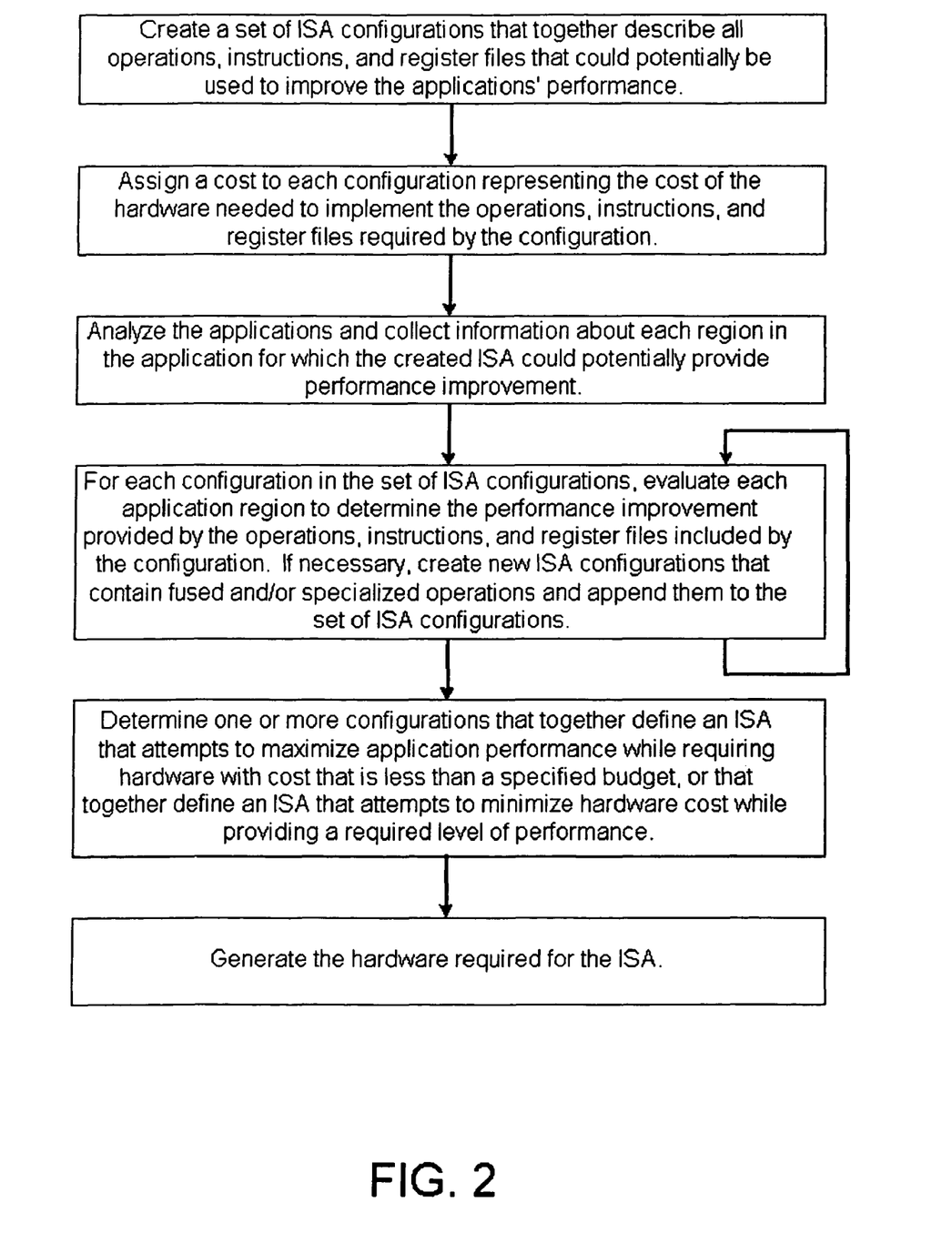
FIG. 2 is a flowchart according to an embodiment of the present invention.

A preferred embodiment of the present invention performs the following steps to create an ISA for a set of applications, illustrated in FIG. 2.

1. Create a set of ISA configurations that together describe all operations, instructions, and register files that could potentially be used to improve the applications' performance.

2. Assign a cost to each configuration representing the cost of the hardware needed to implement the operations, instructions, and register files required by the configuration, as explained above.

3. Analyze the applications and collect information about each region in the application for which the created ISA could potentially provide performance improvement.

4. For each configuration in the set of ISA configurations, evaluate each application region to determine the performance improvement provided by the operations, instructions, and register files included by the configuration. If necessary, create new ISA configurations that contain fused and/or specialized operations and append them to the set of ISA configurations.

5. Determine one or more configurations that together define an ISA that attempts to maximize application performance while requiring hardware with cost that is less than a specified budget, or that together define an ISA that attempts to minimize hardware cost while providing a required level of performance.

6. Generate the hardware required for the ISA.

Creating ISA Configurations

A preferred embodiment of the present invention creates a set of ISA configurations by enumerating all combinations of VL, IW, OC, ITS, and OW parameter values. Configurations containing fused or specialized operations are created later (i.e., the COS parameter of each created configuration is empty), as described below. To avoid creating too many configurations, limitations on allowed parameter values may be imposed based on the limits of the target processor and based on guidance from the user. For example, the issue width will be limited by the number of bits required to encode the operations' opcodes and operands in each slot of the instruction. Further, if the target processor allows at most one memory interface, then the MEMORY operation class can occur in at most one slot of an instruction template.

As an alternative to generating the ISA configurations automatically, the user may also specifically choose the set of configurations that should be considered.

Figure 3:
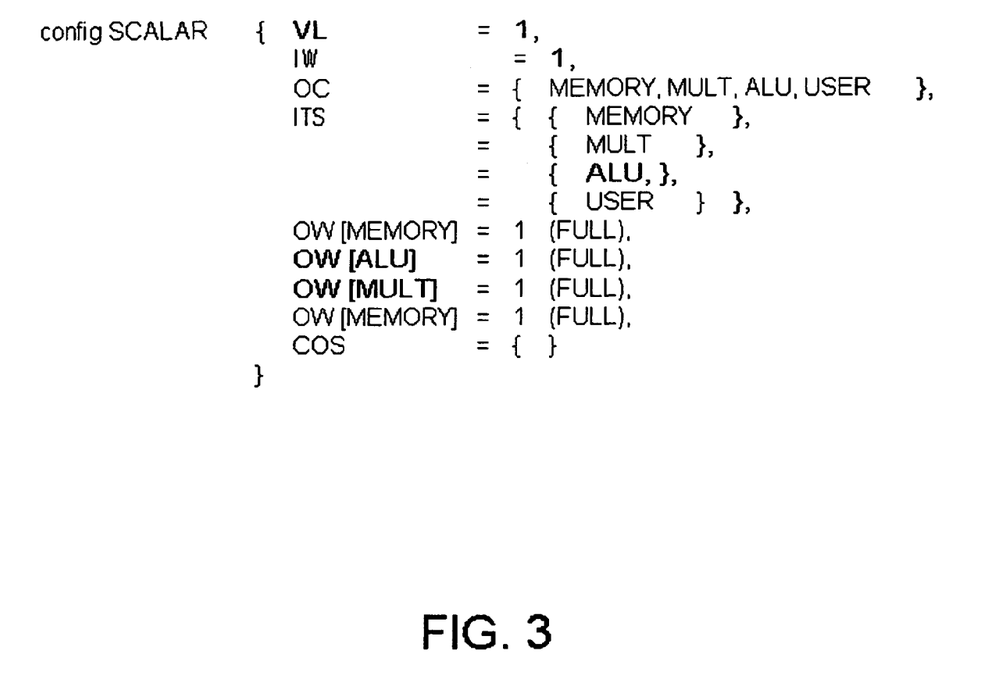
FIG. 3 is a scalar configuration according to an embodiment of the present invention.

A special ISA configuration, called SCALAR, is always created. SCALAR represents an instruction set that allows only one operation per instruction, and that performs only scalar operations. The SCALAR configuration is used as a baseline against which all other configurations are compared. A possible SCALAR configuration is shown in FIG. 3.

Each ISA configuration is assigned an initial cost representing the hardware cost of the logic needed to implement the instructions, operations, and register files making up the configuration. The most exact hardware cost can be found by actually creating the logic necessary to implement the configuration, and measuring the size of the resulting hardware. The logic can be created automatically using logic synthesis techniques such as those provided by Synopsys' DesignCompiler. However, this is too time consuming to be practical. Instead, a database of typical hardware costs can be collected from the synthesis of a limited number of configurations.

For example, the database would record the cost of an adder, a multiplier, a register file port, a memory interface, etc. Using the database, the initial cost of a configuration can quickly be estimated from the cost of the component parts of the configuration. The initial cost of a configuration does not include the cost of any combined operations or the cost of the register file entries. These cost are added to the configuration later, as described below.

Evaluate Benefit of ISA Configurations

A preferred embodiment of the present invention next determines the benefit that each ISA configuration provides, and the register file requirements, for each region of the application. In the preferred embodiment, a region is a loop nest or single basic-block (Aho et al., *Compilers: Principle Techniques and Tools*, section 9.4, page 528-529) of code not contained in any loop. For each configuration, the benefit is the cycle count reduction enabled by the configuration, relative to the SCALAR configuration.

For each region, the invention collects analysis information that is used to determine all the configurations' benefits for that region. The analysis information includes the following:

1. DEP_GRAPH: The dependence graph for the operations in the region (Morgan, *Building an Optimizing Compiler*, page 242).

2. EXEC_CNT: The execution count of the region. In the preferred embodiment the execution count if derived from real or estimated profiles (Wall, "Predicting Program Behavior Using Real or Estimated Profiles", *Proceedings of the ACM SIGPLAN* 1991 *Conference on Programming Language Design and Implementation*), or from user-supplied directives. Real profiles are collected from the actual execution of the application, while estimated profiles are determined by examining the loop structure and other properties of the application. A user-supplied directive is inserted into the application to indicate the execution count of a region, by using a pragma, for example.

3. VL: A set of vector lengths that can be used for operations in this region, and that potentially provide a performance improvement compared to shorter length vectors. The invention uses prior art dependence analysis (Maydan et al., "An Efficient Method for Extract Data Dependence Analysis", PLDI 1991, pp. 1-14) loop transformation (Wolf et al., "Combining Loop Transformations Considering Caches And Scheduling", *Proc. MICRO* '96, pages 274-286, 1996) and vectorization techniques to determine if the region can be vectorized, so that it can exploit vector operations. If the region can be vectorized, VL indicates which vector lengths can be used for the region and that provide a performance improvement compared to shorter vectors. If the region cannot be vectorized, VL={1}, i.e., only non-vector operations can be used for the region.

Figure 4A:
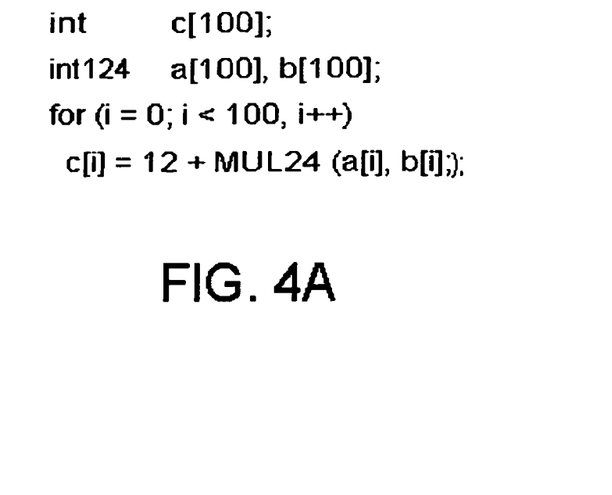
FIGS. 4A and 4B are a region of C code and a corresponding dependence graph according to an embodiment of the present invention.
Figure 4B:
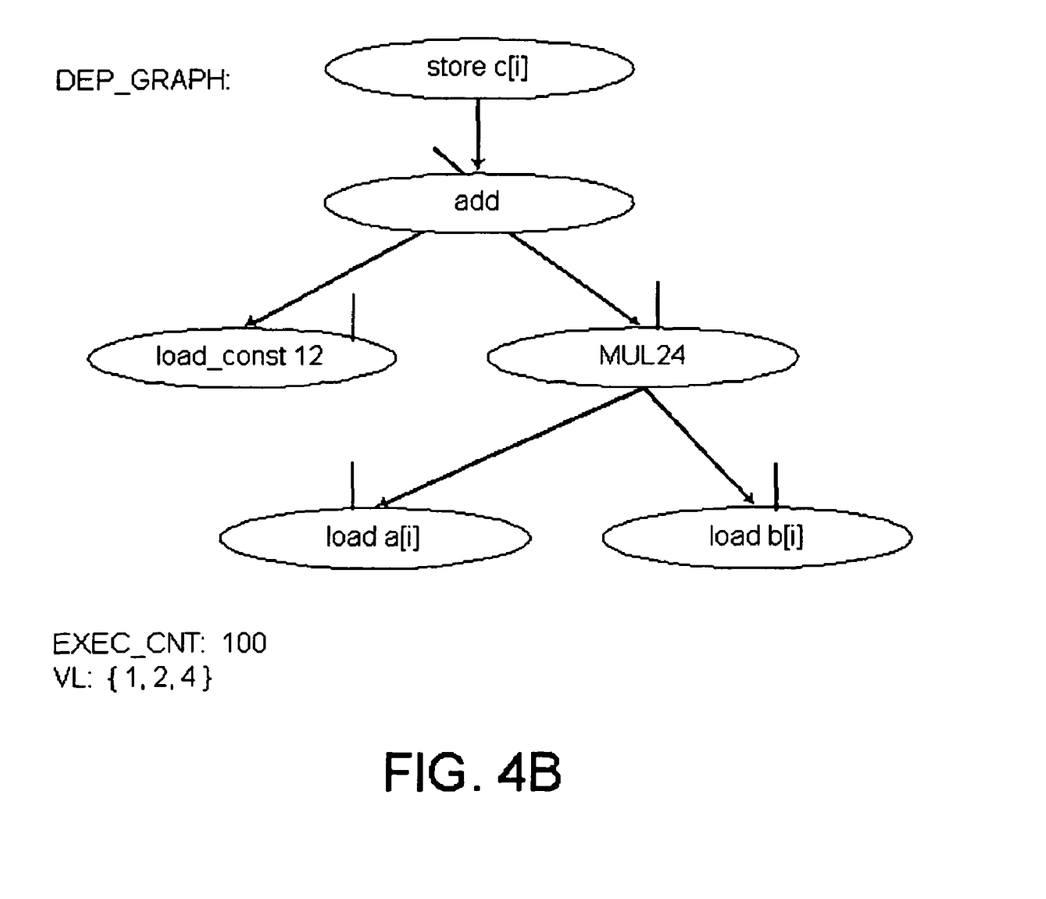

For example, a region of C code and the corresponding dependence graph are shown in FIGS. 4A and 4B, respectively. The code uses the user-defined int24 type and the user-defined MUL24 operation, both defined above. The load_const operation is an ALU class operation that sets an integer register to the specified constant value. The region executes 100 times, and can be vectorized to exploit either 2-wide or 4-wide vector operations.

For each region, the preferred embodiment uses the analysis information to evaluate the benefit for each ISA configuration. Some configurations do not provide the operations necessary to execute the region, and so are simply assigned negative benefit. These are configurations that do not implement an operation class required by the region, or have a vector length that does not provide improved performance compared to shorter vector lengths. The example region contains the user-defined MUL24 operation, and so only ISA configurations that implement the USER operation class can be used to implement the region. Similarly, a configuration with VL=8 will not provide any performance improvement compared with a configuration that is identical except that it has VL=4 vectors.

If a configuration can be used to implement the region, the first step in determining the benefit provided by that configuration for the region is to use an instruction scheduling algorithm to accurately determine the number of cycles required to execute the region, and the minimum number of registers needed for the region. The preferred embodiment uses any prior art software pipelining algorithm for regions representing loops, and uses any prior art scheduling algorithm for other regions.

As an alternative to software pipelining or a scheduling algorithm, an estimate of the number of cycles requested to execute the region can be determined using resource bounds as is done in software pipelining. The scheduling algorithms determine the instructions required to implement the region in the minimum number of cycles, and determine the minimum number of registers necessary to hold all the values operated on by the instructions.

Before applying the scheduling algorithm, each operation belonging to an operation class that has operation width less than one must be implemented as an iterative operation, or must be replicated. If the operation is implemented as an iterative operation, the same logic is used to produce the multiple parts of the result. Because the same logic is used repeatedly to produce the entire result, the latency of the iterative operation is longer than a non-iterative operation. If the operation is replicated, multiple versions of the operation are created to produce the entire output. Each version of the operation consumes the same inputs. Each version of the operation consumes the same inputs, but produces different parts of the output. For example, the example vec4 configuration from above performs half width MUL24 operations. Thus, to compute a vector of four MUL24 results requires two operations, a MUL24_0 operation that computes two vector elements, and a MUL24_1 operation that computes the other two vector elements.

Because all replications of an operation depend on the same inputs, and produce different parts of the same output, the dependence graph is modified to show the replicated operations as forming a dependence chain between the input operands and the output operands. For example, the vec4 configuration requires the modified dependence graph shown in FIG. 5.

Figure 6:
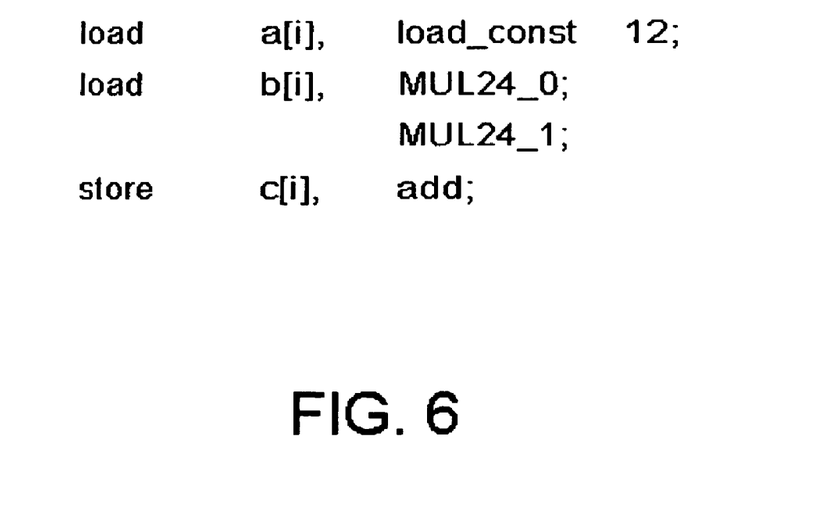
FIG. 6 is a four cycle schedule according to an embodiment of the present invention.

Next, the scheduling algorithm is applied to the modified dependence graph. For example, using the prior art software-pipelining algorithm with ISA configuration vec4 on the example region yields the four cycle schedule shown in FIG. 6. The schedule is possible because the vec4 configuration allows a MEMORY class operation in slot 0 to be grouped with either a USER or ALU operation in slot 1.

It may be possible to reduce the cycle count further by using the Fused Operation and/or Specialization techniques. The Fused Operation technique combines two or more dependent operations into a new fused operation. Using the fused operation in place of the original operations can decrease cycle count because the fused operation requires fewer issue slots than the original operations, and because the fused operation may have shorter latency than the total latency of the original operations.

A candidate group of dependent operations is any connected component of the dependence graph, where the operations in that component can be implemented as a single fused operation. Limits may be placed on the number and classes of operations that can be implemented as a fused operation, and on the number of operands in the fused operation. Operation class limits are required to limit the hardware resources required by the fused operation.

For example, limiting MEMORY class operations in a fused operation to one insures that the hardware required to implement the fused operation will require at most one memory interface. The number of operands can be limited to insure that the fused operation can be encoded in the bits allowed for it. The number of bits available for an operation depend on the size of the instruction, and on the IW of the configuration (i.e., the number of operations encoded in the instruction). For this example, assume fused operations are limited to contain at most one MEMORY class operation, with no limits on the number of MULT, ALU, and USER class operations, and are limited to at most four operands.

For the example dependence graph, there is a connected component of the dependence graph containing all the operations; however, combining all the operations into a single fused operation would require multiple MEMORY class operations. Because this exceeds the limit of one MEMORY class operation, that connected component is not considered as a candidate. Similarly, other connected components can be eliminated from consideration.

Figure 7:
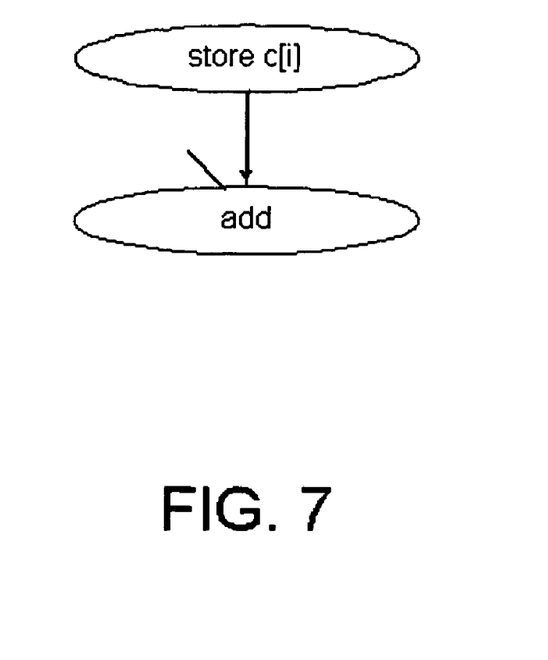
FIG. 7 is a dependence graph for a fused operation according to an embodiment of the present invention.

For each candidate fused operation, the dependence graph is modified to use the candidate fused operation, and then rescheduled to determine if the operation provides any cycle reduction. In the preferred embodiment, the latency for the fused operation is determined from a database that holds the time required by the logic that implements each operation, not including the time to decode the operation, or to read or write operands. The time required for a fused operation is the maximum of the sum of times required for the operations along any dependence chain in the component of the dependence graph representing the fused operation, plus the time to decode the operation and read and write the operands. For each fused operation that provides a cycle reduction, a copy of the ISA configuration is created, the fused operation is added to the combined operation set of the configuration, and the cost of the configuration is increased by the cost of the fused operation. The cost of each fused operation is determined in the same way as the cost of the ISA configuration. In the preferred embodiment, a database of component hardware cost is consulted, and the cost of the fused operation is the sum of the cost of the composing operations. For example, using the example dependence graph with the vec4 configuration, the connected component of the dependence graph shown in FIG. 7 represents a candidate fused operation. The latency of the fused operation is one cycle.

Figure 8A:
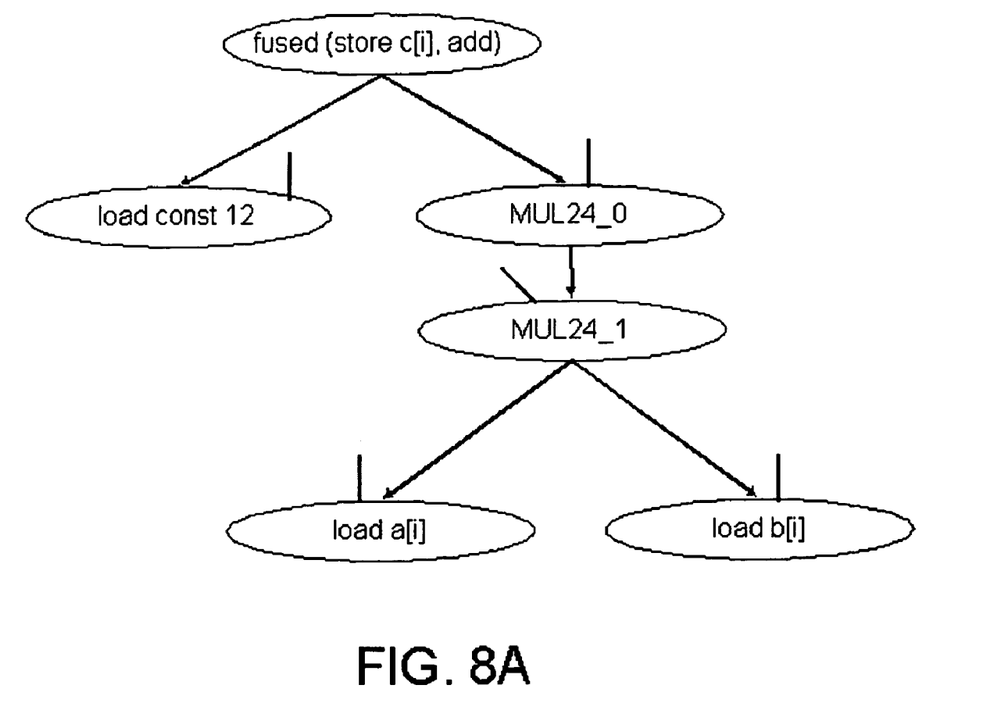
FIGS. 8A and 8B are a dependence graph and resulting schedule using a fused graph according to an embodiment of the present invention.
Figure 8B:
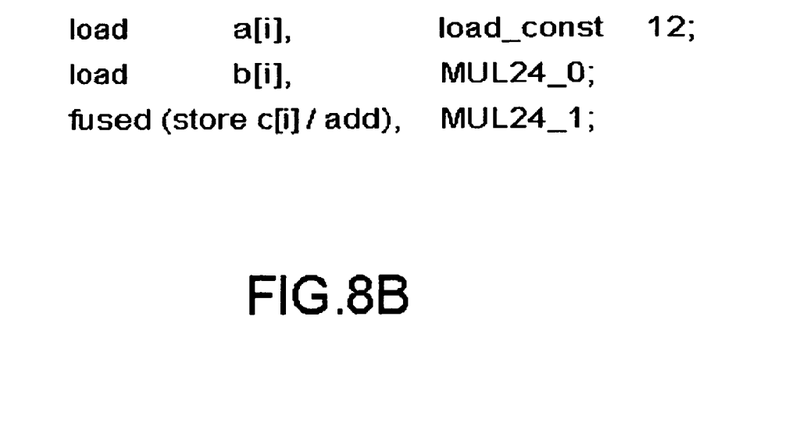

The dependence graph modified to use the fused operation and the resulting schedule are shown in FIGS. 8A and 8B. Using the fused operation reduces the cycle count from four to three, and so a copy of the ISA configuration is created, the fused operation is added to the ISA configuration copy, and the cost of the ISA configuration copy is increased to include the cost of the fused operation.

Assuming the SCALAR configuration requires a six cycle schedule for the region shown in FIG. 4A, the schedule shown in FIG. 8B provides a three cycle improvement. Additional cycle reduction is realized if the configuration uses vector operations to reduce the execution frequency of the region. For example, because the vec4 configuration operates on vectors of length four, the loop in the example region must execute only 25 times instead of 100, and so the instructions are executed only one-fourth as often as in the SCALAR configuration. The benefit for each configuration is found by taking the cycle count of the configuration relative to the SCALAR configuration.

The scheduling algorithms also determine the minimum number of registers required for each type. The maximum number of registers required for each type, across all regions, is recorded with each configuration. Also, the cost of each configuration is increased to account for the cost of the registers required for that configuration.

After finding the benefit of each configuration for each region, each configuration is examined again to see if the Specialization technique can be used to reduce the configuration's hardware cost by replacing a generic operation with one that operates on one or more constant values, or on a smaller range of values. For each configuration, the Specialization technique examines the dependence graph of each region to find candidate specialized operations. Any operation in the dependence graph for which one or more inputs is a constant or smaller range value is a specialization candidate.

Figure 5:
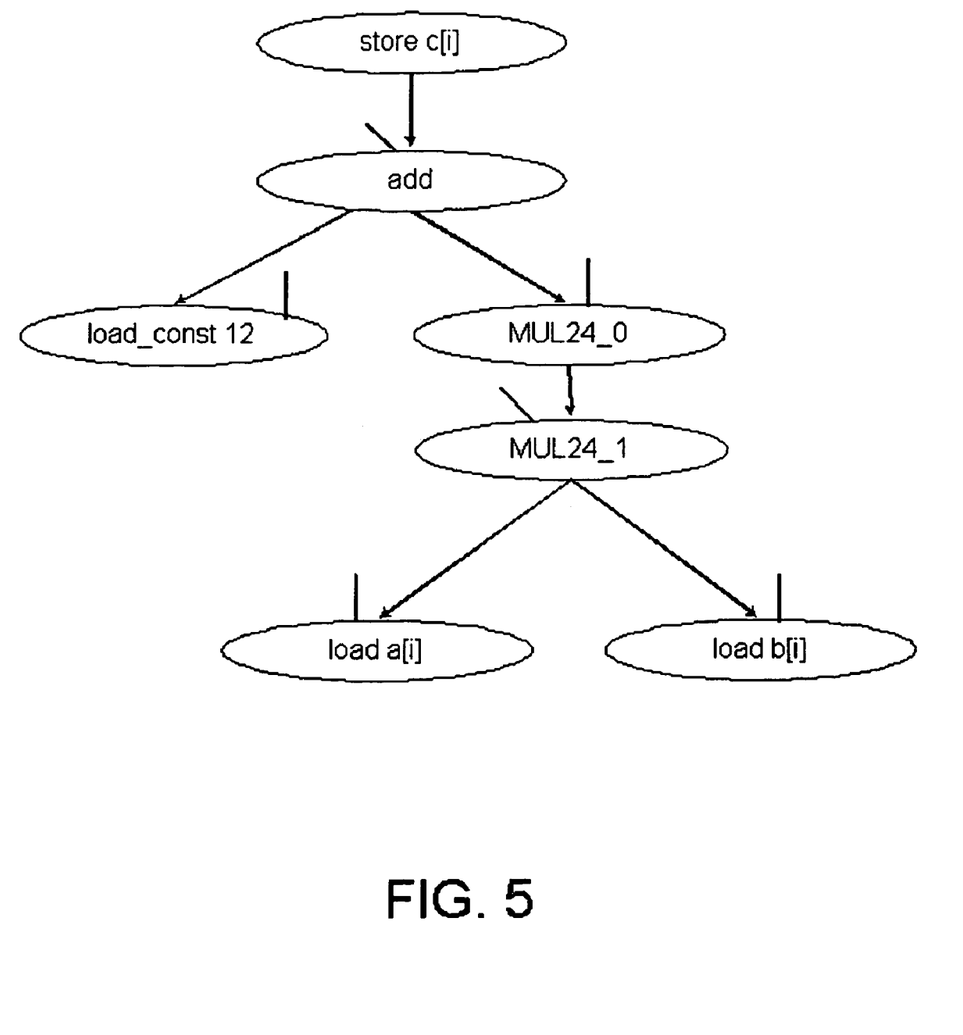
FIG. 5 is a modified vec4 dependence graph according to an embodiment of the present invention.
Figure 9:
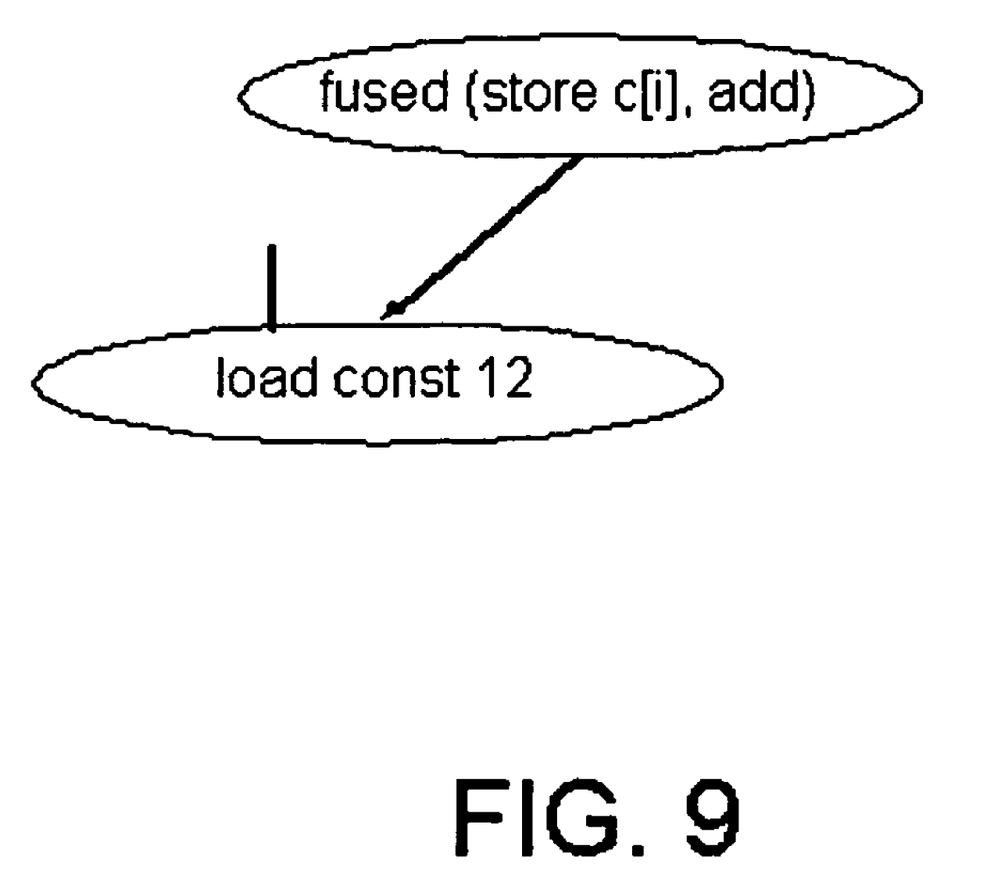
FIG. 9 is a dependence graph for a specialized operation according to an embodiment of the present invention.

For example, the dependence graph shown in FIG. 5(A), has the candidate specialized operation represented by the dependence graph in FIG. 9.

A specialization candidate will reduce hardware cost if it replaces a generic version of an operation with a specialized operation. Thus, if the generic operation in the specialization candidate is not required in any region, then the generic operation can be replaced by the specialized operation, potentially reducing hardware cost. For example, the specialization candidate represented by the dependence graph in FIG. 9 potentially reduces hardware cost if no region requires a generic version of the fused (store c[i], add) operation.

If a generic operation can be replaced by the specialized operation, then a copy of the ISA configuration is created, the specialized operation is added to the combined operation set of the configuration (replacing the corresponding fused operation, if the generic operation is a fused operation), and the cost of the configuration is decreased by the difference between the cost of the specialized operation and the corresponding generic operation. For example, assuming a generic version of the fused (store c[i], add) operation is not required by any region, it is replaced in the configuration by the specialized fused (store c[i], add 12) operation, and the cost of the configuration is decreased to account for the difference in cost of the specialized and generic operations.

Determine ISA Configurations that Compose ISA

The preferred embodiment now has the cost and register requirements for each ISA configuration, and the performance benefit of that configuration for each region. Next, the invention collects a solution set of one or more configurations such that one of the two following conditions is satisfied. Together, the configurations in the solution set make up the ISA.

1. Given a hardware cost budget, attempt to maximize the benefit of the configurations in the solution set under the constraint that the total cost of the configurations in the solution set does not exceed the budget.

2. Given a performance benefit goal, attempt to minimize the total hardware cost of the configurations in the solution set under the constraint that the benefit provided by the configurations meets or exceeds the performance benefit goal.

The following steps (also shown in FIG. 10) are used to attempt to maximize benefit without exceeding the given cost budget.

Figure 10:
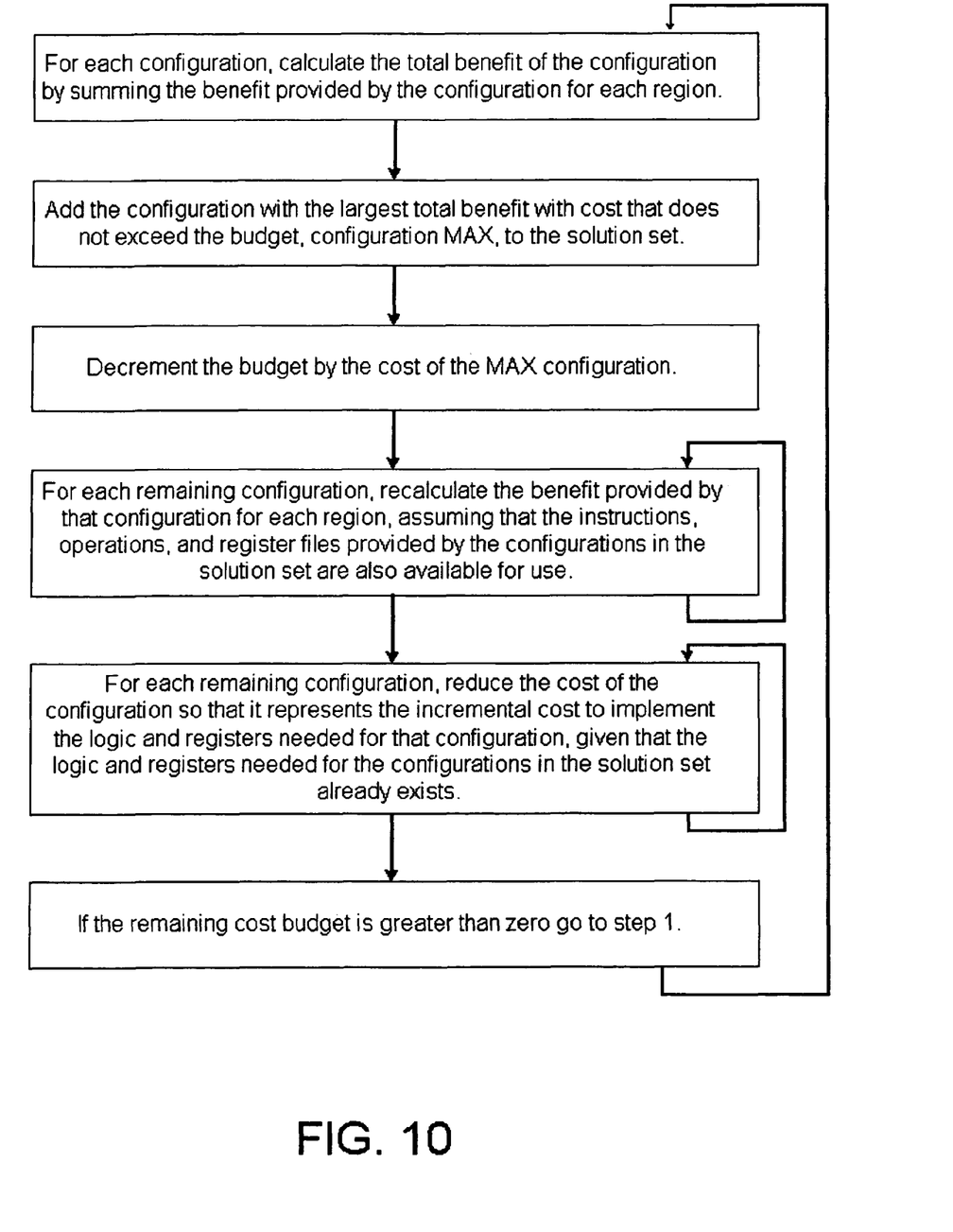
FIG. 10 is an ISA design process used to attempt to maximize benefit without exceeding a given cost budget according to an embodiment of the present invention.

1. For each configuration, calculate the total benefit of the configuration by summing the benefit provided by the configuration for each region.

2. Add the configuration with the largest total benefit (if multiple configurations have the largest total benefit, choose the one with the smallest cost) with cost that does not exceed the budget, configuration MAX, to the solution set.

3. Decrement the budget by the cost of the MAX configuration.

4. For each remaining configuration, recalculate the benefit provided by that configuration for each region, assuming that the instructions, operations, and register files provided by the configurations in the solution set are also available for use.

5. For each remaining configuration, reduce the cost of the configuration so that it represents the incremental cost to implement the logic and registers needed for that configuration, given that the logic and registers needed for the configurations in the solution set already exists. In the preferred embodiment, the incremental cost of a configuration is found by costing only those components of the configuration that are not already present in the solution set configurations. As before, hardware cost for each component is estimated using a database of hardware costs. For example, assume the solution set contains a configuration that implements a 4-wide ALU operation class. If some configuration A requires a 1, 2, or 4-wide ALU operation class, the cost of the logic required for that class is removed from the cost of configuration A since that logic is already provided by a solution set configuration. Similarly, if configuration A requires an 8-wide ALU operation class, the cost of the logic required for that class is the difference between the cost of the logic required for a 4-wide ALU operation class and the cost of the logic required for an 8-wide ALU operation class. So, configuration A's cost is reduced to account for the difference between the hardware cost of the 8-wide ALU operation class logic and the incremental cost.

6. If the remaining cost budget is greater than zero go to step 1.

The following steps (also shown in FIG. 11) are used to attempt to minimize cost while reaching or exceeding the benefit goal.

Figure 11:
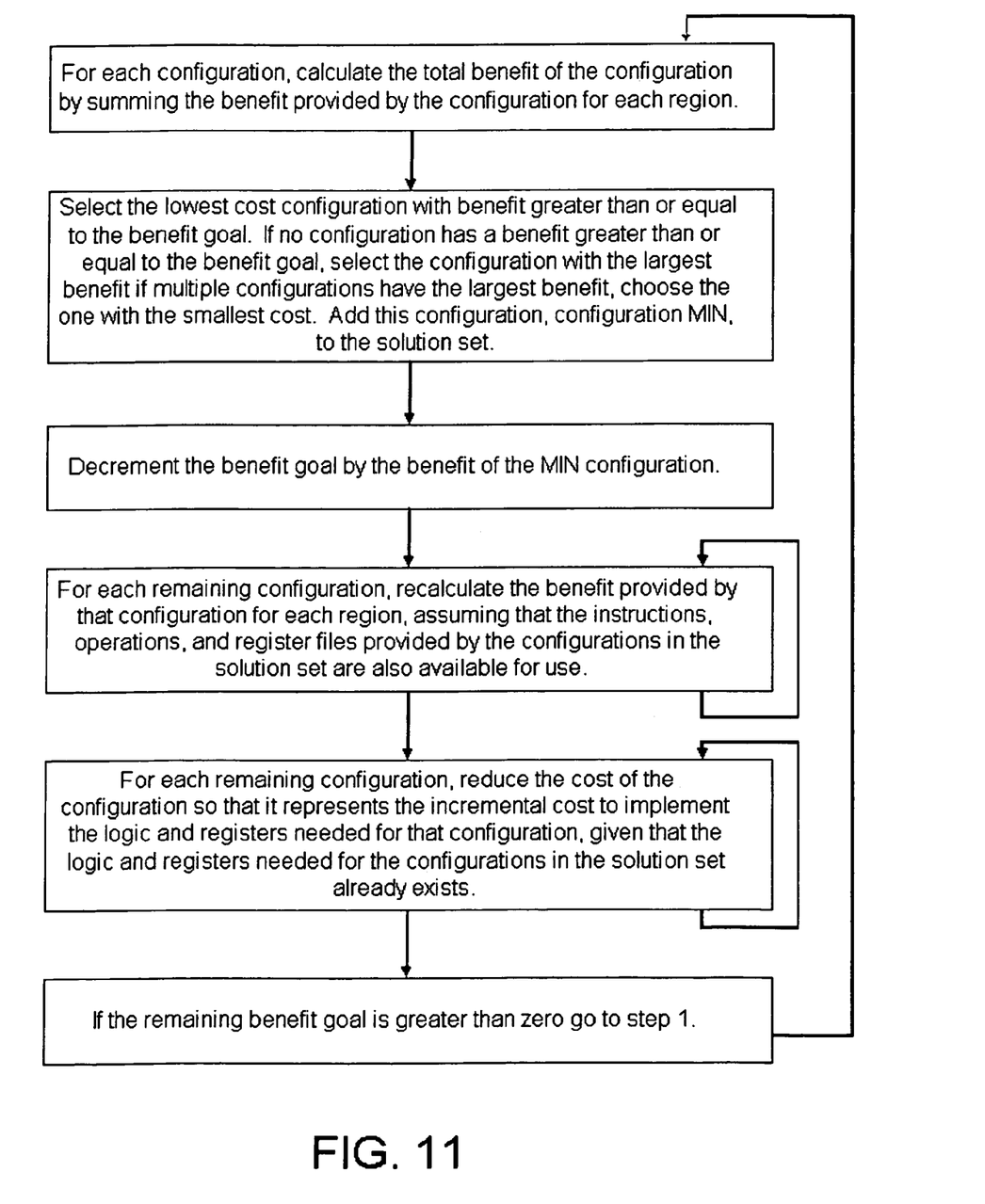
FIG. 11 is an ISA design process used to attempt to minimize cost while reaching or exceeding a benefit goal.

1. For each configuration, calculate the total benefit of the configuration by summing the benefit provided by the configuration for each region.

2. Select the lowest cost configuration with benefit greater than or equal to the benefit goal. If no configuration has a benefit greater than or equal to the benefit goal, select the configuration with the largest benefit (if multiple configurations have the largest benefit, choose the one with the smallest cost). Add this configuration, configuration MIN, to the solution set.

3. Decrement the benefit goal by the benefit of the MIN configuration.

4. Same as step 4 above with configuration MIN substituted for configuration MAX.

5. Same as step 5 above

6. If the remaining benefit goal is greater than zero go to step 1.

Generating Hardware to Describe ISA

The solution set indicates the set of ISA configurations that together describe the ISA that the invention is creating. The hardware required to implement the ISA must now be specified. This section outlines the hardware that must be generated to implement the created ISA.

The number of registers required to hold each type in the solution set is the maximum of the required registers of each configuration in the solution set. The register requirements are further combined to account for the sharing of registers amongst different types. For example, in the preferred embodiment, a single register file is used for all vector integer types. Thus, the number of registers in the vector integer register file is the maximum of the registers required for any integer vector type.

The width of each register file entry is determined by the width of the maximum type contained in that register file. For example, the vec4 configuration requires that the vector integer register file be wide enough to hold four values of the largest integer type, i.e., long; and requires that the vector user-register file be wide enough to hold four int24 values. Assuming the minimum number of vector integer registers required for any region is sixteen, and the minimum number of vector user registers is required for any region is four, the hardware for the ISA must implement a sixteen entry vector register file to hold vectors of four integer values (i.e., each entry is 128 bits), and must implement a four entry vector register file to hold vectors of four user-defined int24 values (i.e., each entry is 96 bits).

The number of read and write ports required on each register file is found by examining the instruction templates of all configurations that describe the ISA. The number of register file read and write ports required for each register file is the maximum of the number of read and write ports required by the operations that can occur in any instruction template.

The hardware for the ISA must also contain the logic that implements the operations required by each configuration. For example, the logic for the vec4 configuration must implement four-wide vector versions of all the MEMORY and ALU class operations (because VL=4 and OW[MEMORY]=OW[ALU]=1), and must implement two-wide vector versions of all MULT and USER class operations (because VL=4 and OW[MULT]=OW[USER]=0.5).

The preferred embodiments described above have been presented for purposes of explanation only, and the present invention should not be construed to be so limited. Variations on the present invention will become readily apparent to those skilled in the art after reading this description, and the present invention and appended claims are intended to encompass such variations as well.

What is claimed is:

1. A system comprising:
   means for analyzing a software program written in a high level language; and
   means for automatically generating an instruction set architecture optimized for executing that program based on the analysis, wherein the generated instruction set architecture contains at least one vector instruction.

2. A system according to claim 1, wherein the generating means includes means for generating a vector data type corresponding to the vector instruction which is useful for implementing the software program on the generated instruction set architecture.

3. A system according to claim 2, wherein the high level language is C/C++ and the vector data type is generated for a C/C++ compiler.

4. A system according to claim 2, wherein the generating means includes means for automatically generating a vector register file corresponding to the vector data type.

5. A system according to claim 1, further comprising:
   means for receiving a user-defined instruction,
   wherein the generating means includes the user-defined instruction in the generated instruction set architecture.

6. A system according to claim 1, wherein the means for automatically generating includes:
   means for identifying a plurality of instructions that are available to be included in the instruction set architecture;
   means for classifying operations in the identified instructions into a plurality of classes;
   means for combining one or more of the classified operations to form a candidate vector instruction;
   means for determining whether the candidate vector instruction contributes to the optimization of executing the software program; and
   means for including the candidate vector instruction as the at least one vector instruction in the generated instruction set architecture based on the determination.

7. A system according to claim 6, wherein the identified plurality of instructions include at least one user-defined instruction.

8. A system according to claim 6, wherein operations in the plurality of classes respectively share substantially the same hardware in the instruction set architecture.

9. A system according to claim 6, wherein the means for determining includes:
   means for identifying a plurality of regions of the software code; and
   means for evaluating one or more benefits of the candidate vector instruction for each of the identified plurality of regions.

10. A system according to claim 9, wherein the benefits include reduced overall hardware cost.

11. A system according to claim 1, wherein the means for automatically generating the instruction set architecture includes means for generating programmer-visible descriptions of one or more of instructions, operations and register files of a processor that is configured for executing the program.

12. A method comprising:
    analyzing a software program written in a high level language; and
    automatically generating an instruction set architecture optimized for executing that program based on the analysis, wherein the generated instruction set architecture contains at least one vector instruction.

13. A method according to claim 12, wherein the generating step includes generating a vector data type corresponding to the vector instruction which is useful for implementing the software program on the generated instruction set architecture.

14. A method according to claim 13, wherein the high level language is C/C++ and the vector data type is generated for a C/C++ compiler.

15. A method according to claim 14, wherein the generating step includes automatically generating a vector register file corresponding to the vector data type.

16. A method according to claim 12, further comprising:
    receiving a user-defined instruction,
    wherein the generating step includes including the user-defined instruction in the generated instruction set architecture.

17. A method according to claim 12, wherein automatically generating includes:
    identifying a plurality of instructions that are available to be included in the instruction set architecture;
    classifying operations in the identified instructions into a plurality of classes;
    combining one or more of the classified operations to form a candidate vector instruction;
    determining whether the candidate vector instruction contributes to the optimization of executing the software program; and
    including the candidate vector instruction as the at least one vector instruction in the generated instruction set architecture based on the determination.

18. A method according to claim 17, wherein the identified plurality of instructions include at least one user-defined instruction.

19. A method according to claim 17, wherein operations in the plurality of classes respectively share substantially the same hardware in the instruction set architecture.

20. A method according to claim 17, wherein determining includes:
    identifying a plurality of regions of the software code; and
    evaluating one or more benefits of the candidate vector instruction for each of the identified plurality of regions.

21. A method according to claim 20, wherein the benefits include reduced overall hardware cost.

22. A method according to claim 12, wherein the step of automatically generating the instruction set architecture includes generating programmer-visible descriptions of one or more of instructions, operations and register files of a processor that is configured for executing the program.

* * * * *